July 6, 1965 R. F. WOLLEK 3,193,049
SOUND DAMPING TAPE
Filed May 27, 1963
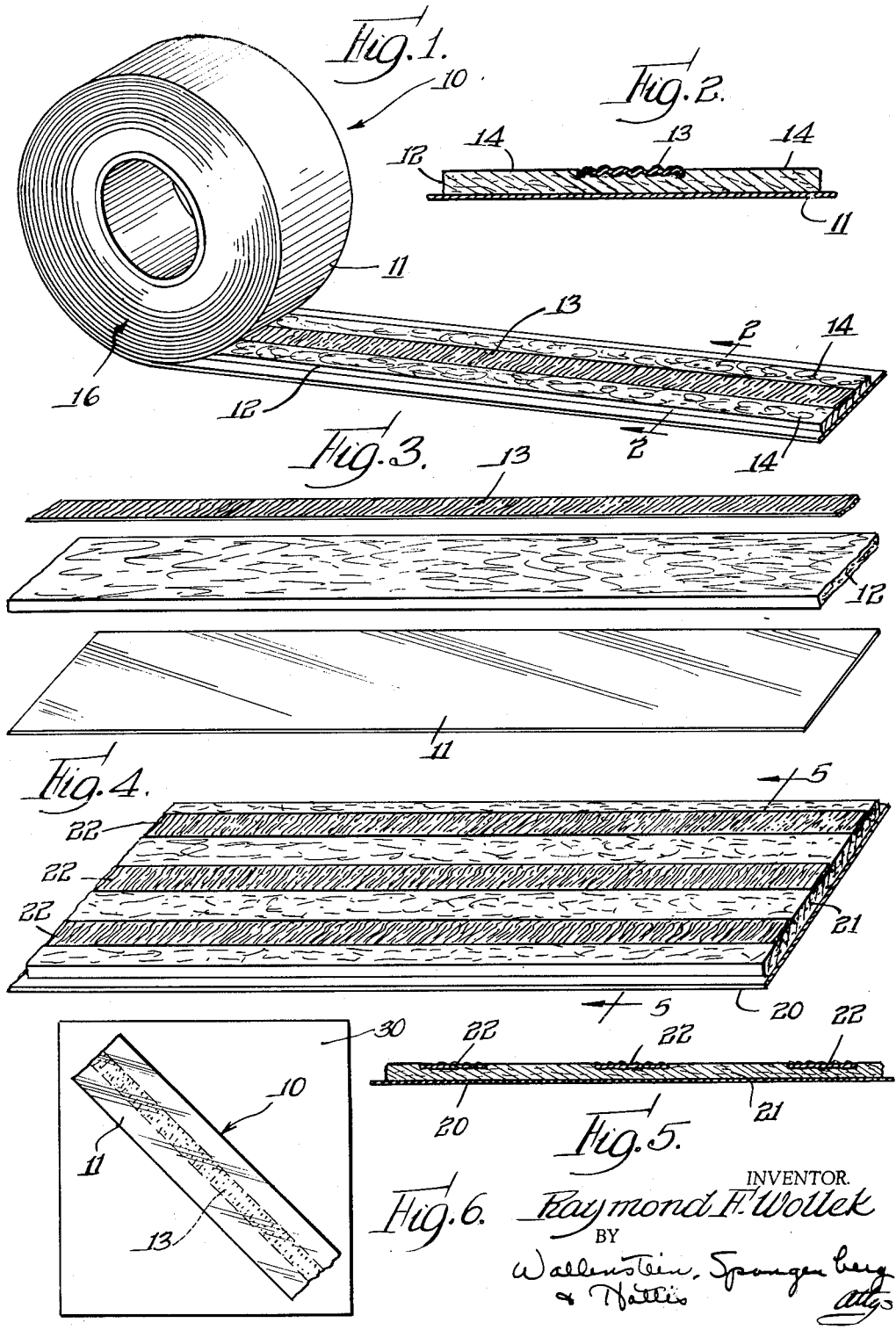
INVENTOR.
Raymond F. Wollek
BY
Wallenstein, Spangenberg
& Hattis
attys

United States Patent Office 3,193,049
Patented July 6, 1965

3,193,049
SOUND DAMPING TAPE
Raymond F. Wollek, Chicago, Ill., assignor to Daubert Chemical Company, Chicago, Ill., a corporation of Illinois
Filed May 27, 1963, Ser. No. 283,246
16 Claims. (Cl. 181—33)

The present invention is concerned with sound damping and relates particularly to sound damping materials in tape or relatively narrow sheet form (hereafter for convenience referred to generically as tape or tapes) and the utilization thereof for damping sound vibrations in numerous environments, all as is hereafter described in detail.

The damping, deadening or absorption of sound vibrations is a problem to which a great deal of attention has been given for a long period of time by those versed in the art. Typical of approaches thereto are shown by such illustrative U.S. patents as Nos. 1,628,090; 1,928,034; 2,087,248; 2,355,568; 2,386,502; 2,534,137; and 2,819,032. Some of the difficulties with various heretofore known prior art practices and proposals, such as excessive weight, unwieldly thicknesses, high equipment costs, difficulty in application, and limited effectiveness are outlined in the aforementioned U.S. Patent No. 2,355,568. Possibly the most widespread current use of sound damping or sound deadening materials is in the form of spray-on coatings.

In more recent years, in an effort to reduce weight and for other reasons as well, vibration damping tapes have been suggested and utilized in the art, reference thereto being made, for example, in the aforesaid U.S. Patent No. 2,819,032. Typical of such vibration damping tapes is one comprising an aluminum foil backing of about 0.0017 inch thickness laminated with a pressure-sensitive adhesive to an unbleached cotton cloth, utilizing a rubber-base pressure-sensitive adhesive. Such vibration damping tape is attached to the thin sheet metal panels where sound is transmitted through the panels by the vibration of the panels themselves. The aluminum foil is separated from the sheet metal panel to which it is attached by an approximately 14 mil thickness of adhesive and cloth, and the mechanism of the sound damping is alleged to result from the existence of a so-called "truss" effect which adds to the stiffness of the metal panel and which combines with the natural absorbing qualities of the rubber forming the base of the adhesive.

One of the main difficulties with sound damping tapes, of the type described above, is that their sound damping properties are far too inadequate. This may, for example, be seen in connection with the well known and frequently utilized Geiger Sound Attenuation Test. This test, which measures the decay rate of vibrational noise induced in a steel panel, is referred to in the aforementioned U.S. Patent No. 2,386,502. It comprises, generally speaking, supporting, at its nodal points, a 20" x 20" x ¼" cold rolled steel panel having a natural resonant frequency of 160 cycles per second, then electromagnetically exciting said panel to its resonant frequency, then discontinuing said excitation, and measuring the time elapsed for a 10 decibel drop off in sound intensity. The decay rate is reported in decibels per second. In a typical series of measurements, in accordance with the aforesaid Geiger Test, the decay rates of the bare metal panel, measured at 10 degrees F. intervals beginning at 0 degrees F. and ending at 100 degrees F., ranged from 1.20 to 1.02 decibels per second. Utilizing the metal panel to which the sound damping tape was applied, the decay rates, under the same temperature interval conditions, ranged from 4.73 to 1.90 decibels per second. The differences in the decay rates of the bare metal panel and the metal panel to which the sound damping tape was applied, at any given temperature within the range at which testing is done, represents the sound damping effect of the tape. As will be pointed out hereafter in detail, the sound damping effects obtained by sound damping tapes made in accordance with the present invention are several fold as great as those obtainable with various presently known tapes such as described above, indeed, in certain cases, of the order of 3 to 5 times as great or even greater.

In accordance with the present invention, a unique sound damping tape is provided which advantageously comprises a base or backing member, especially a flexible base or backing member of which thin aluminum foil laminated on one side to kraft paper represents a particularly preferred embodiment. The said base member carries, on its paper side, a layer of an energy or sound dissipative material which may be provided with an adhesive on its upper or exposed surface but which, especially desirably, is itself an adhesive body possessing a tacky surface in the manner of a pressure-sensitive adhesive. The energy or sound dissipative material is advantageously laid down in a continuous body to substantially cover the length and to mainly or substantially cover the width of the base member. In certain cases, it may be desirable, but it is usually unnecessary, to apply a primer coating on the base member to improve the bonding thereto of the energy or sound dissipative material. The structure of the unique sound damping tape of the present invention is completed by adhering at least one area of non-adhesive conversion material to the energy or sound dissipative material. The area of non-adhesive conversion material especially advantageously is formed of a continuous, unbroken strip of creped parchment paper, of lesser width than the width of the sound dissipative material, and is disposed along the length of the tape well within the longitudinal margins of the energy or sound dissipative material to leave laterally spaced longitudinally extending surface areas of the adhesive surfaced energy or sound dissipative material. In its usual form, the tape of this invention is characterized by having a substantially centrally disposed, longitudinally extending, continuous strip of creped parchment paper adhered to the surface of the energy or sound dissipative material, the troughs, depressions, or low areas of the creped parchment paper lying in a plane very slightly below the plane of the spaced, metal surface-contacting adhesive surfaces of the energy or sound dissipative material. The term "conversion material" as used herein refers to a resilient barrier material which presents a free, non-adhering surface between a vibratile surface and the sound dissipative material on which it is carried, and which has the property of being capable of converting mechanical (vibratory) energy to frictional (heat) energy.

In the particularly preferred embodiment of the present invention, the sound damping tape base member is made of an aluminum metal or alloy foil (hereinafter for convenience referred to simply as aluminum foil) which advantageously is laminated on one side to a thin paper sheet. Metal foil thicknesses may vary considerably but it is preferred to use metal foils of thicknesses of the order of 0.25 to 0.4 mil. In place of aluminum foil, although much less economical, other metal foils can be used such as tin foil and foils made from alloys of magnesium, titanium and copper. In the broader aspects of this invention, no metal foil at all is required; and while base members other than metal foils can be used such as of cellulose or cellulose derivatives or synthetic plastic, it is also within the broader purview of the invention to produce sound damping tapes which do not utilize any separate base or backing member.

The energy or sound dissipative adhesive material is most desirably, particularly from the standpoint of economy, a mastic which is inherently tacky or adhesively pressure-sensitive, that is, it possesses the ability to adhere, and particularly desirably to adhere very firmly, to the metal sheet, panel or like surface simply by pressing against surface with hand or analogous pressure. Such mastics are well known in the art and are readily available for selection. Mastics that have been found to be very satisfactory, and this is mentioned solely by way of illustration and not limitation, have the following compositions, the parts listed being by weight:

*Example A*

| | |
|---|---|
| Polybutene (Av. M.W. 1100 to 1200) (Viscosity 125,000 to 140,000 SUS at 100 degrees F.) (Oronite 32" or "Indopol H–300") | 18 |
| Natural rubber hydrocarbon | 15.5 |
| Rubbery copolymer of isoprene and isobutylene | 20 |
| Calcium carbonate (325 mesh) | 30.5 |
| Asbestos (7T grade-short fibre) | 15.5 |
| Vegetable fatty acid (Archer-Daniels-Midland Fatty Acid No. 105—Acid value from 195 to 205) | 0.5 |

*Example B*

| | |
|---|---|
| Polybutene ("Indopol H–100—Amoco Chemical Company) | 21.5 |
| Rubbery copolymer of isoprene and isobutylene | 26 |
| Calcium carbonate (325 mesh) | 35 |
| Asbestos (7T grade-short fibre) | 14.5 |
| Aromatic petroleum plasticizer ("A.P. 25"—Pennsylvania Refining Company) | 2 |
| Amine wetting agent ("Redicote T"—Armour & Company) | 1 |

Such mastics, when applied to an aluminum foil backing or the like in the practice of this invention, retain their pressure-sensitive adhesive properties over substantial periods of time and delamination does not occur over wide ranges of temperature as, for example, from −20 degrees F. to 400 degrees F.

Other energy or sound dissipative pressure-sensitive adhesive materials which are of non-mastic character and which possess low cold-flow properties can, of course, be utilized. In general, they desirably contain rubber or rubber-like materials of natural or synthetic character, illustrative examples of which comprise polyisobutylenes of high molecular weight, polyvinyl chloride, natural gum, Buna rubbers, neoprene, butyl rubbers, and the like.

While, as stated above, the utilization of adhesive mastics is especially desirable as the energy or sound dissipative material, in those instances where slow creep of the sound damping tapes may tend to occur with the mastics and it is desired to avoid the same, various elastomers or asbestos cloth can be used. In such cases, the adhesive may be applied to the said elastomers or asbestos cloth only where fixed contact with the vibrating metal surface is desired. While pressure-sensitive adhesives are especially desirable, as pointed out above, it is also within the broader phases of the present invention to utilize heat- or solvent-activated adhesives which possess strong adherence properties and which have little or no flow characteristics with age. Such adhesives are, per se, well known in the art, and may comprise elastomer-resin compositions or, where high temperature use is involved, may comprise silicate or other inorganic based adhesives.

The conversion materials, representing the non-adhesive area, which aid in converting vibrational energy to thermal energy, are most advantageously striated or creped materials. Especially satisfactory are creped parchment papers and their utilization, in the manner described, represents an especially important, though limited, embodiment of the present invention. The stiffness, thickness and permanence of crease retention in said creped parchment papers influence to some extent the exact sound damping effects obtained but there is nothing critical in the exactitude of these characteristics. Conventional, commercially marketed creped parchment papers have been utilized in the practice of the present invention with excellent results. Other striated or creped materials such as creped glassine papers, high wet-strength creped papers such as resin-impregnated creped papers where the environment in which the damping tapes or sheets are such that the paper may become wet, calendered crepe papers, creped fabrics, or other creped cellulosic and non-cellulosic materials can be utilized. Where high temperatures may be encountered, creped fiber glass, synthetic plastics, metals, and ceramic materials can be utilized. In the broader aspects of the invention, the conversion materials may be relatively smooth surfaces and may comprise paper, paper-coated burlap, resin-impregnated papers, parchment papers, glassine papers, fiber glass, polyurethane foams and polystyrene foams of the order of ⅛″ thickness, and the like. However, as previously stated, creped or similar uneven surfaced conversion materials produce outstandingly satisfactory results and, therefore, are distinctly preferred. Creped papers having from 15 to 65 crep lines per lineal inch are illustrative of those which can very effectively be used in the production of the sound damping tapes of the present invention.

The widths of the sound damping tapes of this invention are variable. Generally speaking, it is desirable to utilize tapes ranging in width from about one inch to about six inches, particularly satisfactory being tapes having widths in the range of about one to about two inches. Some variation in sound damping occurs with changes in width, other factors being equal.

The thickness of the energy or sound dissipative material used in the sound damping tapes of the present invention is subject to substantial variation. Generally speaking, it should desirably range in thickness from about ⅛ inch to ⅜ inch, particularly where an adhesive mastic is utilized, but it may vary appreciably from these values, although if the thickness is relatively substantial the tapes cannot satisfactorily be produced and marketed or distributed in the form of rolls.

The width of the longitudinally extending non-adhesive conversion material area, and the number of such areas provided on the tape, are also variable. Generally speaking, in a tape having a width of from 1 inch to about 2 inches, excellent results can be attained with only one such area adhered to the energy or sound dissipative material. The width of the area in this instance desirably is from ¼ inch to about ¾ inch and, when considered in relation to the width of the energy or sound dissipative material layer, will overlie from about ¼ to ⅓ of the entire width of the adhesive layer. In any event, the spaced adhesive layer areas on either side of the non-adhesive area, or areas, should be of sufficient width to insure good adhesion of the sound damping tape to the metal sheet or panel to which it is to be attached. The length of the non-adhesive conversion material area, or areas, should be substantially the same as that of the tape and desirably should provide the tape with two or more spaced, substantially parallel adhesive areas.

Where the damping tapes of the present invention are marketed in the form of rolls, it is especially desirable, and in certain cases necessary, but depending upon the adhesive nature of the exposed surface of the energy or sound dissipative material, to provide a release coating on the metal foil or other base or backing member where such a base or backing member is utilized. It may, likewise, be desirable to employ a release coating where the tapes are marketed in flat form as by vertically stacking a plurality of tapes face to back in a box or carton or like container in order to prevent undue sticking together of the individual flat tapes. It will be understood, however, that the utilization of a release coating in the environment involved is not critical to the structural features of the sound damping tapes which account for the exceptional results which are achieved with reference to sound or vibration damping. Where a release coating is desired, it may be selected from various of those on the commercial market, many of which comprise silicone based compositions.

The sound damping tapes of this invention can be made to be quite thin and light in weight. Thus, for instance, in an illustrative case, 54 pounds of a sound damping tape made pursuant to the present invention produce twice the sound damping efficiency of 735 pounds of a heretofore conventionally used spray-on coating. Another advantage of the sound damping tapes of this invention is their relatively low cost, and their ease of application in that they require no special production line techniques nor costly equipment, thus bringing about savings in installation and labor. In relation to spray-on coatings, the sound damping tapes of the present invention are easier and safer to handle in that there are no heavy drums to handle and there are no solvent fire hazards. Again, in relation to spray-on coatings, the sound damping tapes of the present invention require much less storage space. By way of illustration, 3 cubic feet of storage area are required to warehouse two cases (each case containing 6 fifty foot rolls, 1½" wide and 3/32" thick) of a typical sound damping tape of the present invention, whereas, by contrast, 12 cubic feet are required for one drum of spray-on material.

Referring now, to the drawings, in which, among other things, illustrative, but particularly preferred, embodiments of the present invention are shown:

FIG. 1 is a perspective view, in roll form, of an embodiment of a sound damping tape made in accordance with the present invention;

FIG. 2 is a vertical sectional view, in enlarged form for convenience of illustration, taken along the line 2—2 of FIG. 1;

FIG. 3 is an exploded perspective view showing the separate parts making up the illustrative sound damping tape shown in FIGS. 1 and 2;

FIG. 4 is a perspective view of another embodiment of the sound damping tape of the present invention;

FIG. 5 is a vertical sectional view, in enlarged form for convenience of illustration, taken along the line 5—5 of FIG. 4; and FIG. 6 is a plan view showing a simple form of application to a steel panel of a sound damping tape made in accordance with the present invention.

Referring now in particular to FIGS. 1, 2 and 3, the embodiment of the sound damping tape there shown and designated generally at 10 includes a paper laminated aluminum foil base or backing 11 upon the paper side of which there is supported, in adhering relation to said base or backing 11, a layer 12 of an energy or sound dissipative tacky mastic composition. The width of the layer 12 advantageously is slightly less than the width of the foil base or backing 11 to eliminate the possibility of the lateral edge portions of the layer 12 from protruding beyond the longitudinal margins of the foil base or backing 11 when the tape 10 is applied to and pressed against, for example, a metal panel. A band or strip 13 of creped parchment paper overlies a portion of the layer 12 and is adhered firmly thereto by reason of the adhesive or tacky nature of the composition forming the layer 12. As clearly shown in FIG. 2, the band or strip 13 is substantially centrally disposed in the layer 12 and extends longitudinally of the tape 10 to leave spaced, substantially parallel and equal areas 14 of adhesive composition. As disposed in the layer 12, portions of the band or strip 13, particularly the troughs, depressions or low points thereof, lie in a plane below the plane of the spaced, exposed, metal surface-contacting surfaces of the layer 12. The sound damping tape 10 is rolled upon itself to form roll 16. The exterior surface of the foil base or backing 11 is provided with a thin release coating (not shown).

In FIGS. 4 and 5 there is illustrated another embodiment of the sound damping tape of the present invention which embodiment includes, as in the previously described embodiment, a paper laminated aluminum foil base or backing 20 upon the paper side of which there is adhered a layer 21 of an energy or sound dissipative tacky mastic composition. Apart from dimensional differences, the embodiment of the invention shown in FIGS. 4 and 5 differs from the first described embodiment in that a series of spaced bands or strips 22 of creped parchment paper overlie the layer 21. As was the case with band or strip 13, the bands or strips 22 are unbroken and continuous, and extend longitudinally of the tape to leave spaced, substantially parallel areas of the mastic composition. This embodiment of the sound damping tape of the present invention can be used to advantage on larger dimensioned metal surfaces.

In FIG. 6, where a simple illustration is given of one form of application of the sound damping tape illustrated in FIGS. 1, 2 and 3 to a sheet of steel, the tape 10 is applied diagonally of the sheet of steel 30 at approximately the nodal points of the steel sheet, the creped paper section 13 lying flat against and in close contact with the surface of said steel sheet.

The sound damping tapes of the present invention have a wide scope of uses. Thus, by way of example, they can be used in such environments as automobile doors, panels, firewalls, hoods and trunk lids; aircraft fuselages and empennage panels; refrigerators, television cabinets, steel desks, filing cabinets, appliance cabinets, commercial and kitchen cabinets, business machine cabinets, heating and ventilating ducts, metal roofing, siding panels, stainless steel sinks, air conditioners, washing machines, trucks, railroad cars, and the like.

In the utilization of the sound damping tapes of this invention, they can be applied in the same manner that sound damping tapes of the prior art have been used. They can, for example, be applied to selected areas of either one or both sides of metal sheets or panels, or several tapes may be superimposed on the tape which is attached to the metal sheet or panel. Generally speaking, in various instances, best results appear to be obtained where the tape is firmly applied at or approximately at nodal points of the metal sheets or panels or like members with the non-adhesive creped paper or the like in face to face contact with said metal sheets or panels or like members. The tape, if not pre-cut to desired size, can be cut from a roll thereof, to the desired length or footage, and pressed directly against the metal surface at the desired area or areas thereof. It will, thus, be seen that it is unnecessary to cover entire metal surface areas as the case with spray-on sound damping compositions.

By way of illustration, tests conducted, in terms of the aforementioned Geiger test, with a sound damping tape made in accordance with the teachings of the present invention and a tape similar in all respect thereto except that the non-adhesive conversion material, in this instance, creped parchment paper, was omitted, showed the following results:

| | Decay Rate In Decibels Per Second | | | |
|---|---|---|---|---|
| | 0 hrs. | 24 hrs. | 48 hrs. | 120 hrs. |
| Tape with ½ inch center strip of creped parchment paper | 50 | 50 | 45 | 45 |
| Tape without creped parchment paper | 8 | 5 | 3 | 3 |

The above tests were run at 70 degrees F. The tapes employed in the tests were 1½ inches wide, 29 inches long and 5/16 inch thick.

The exact mechanism of the sound damping or deadening action of the tapes of the present invention has not fully been ascertained. It appears, however, from various tests and studies which have been carried out that it is not due to such effects as lateral surface friction between the tape and the metal sheet or panel, internal friction due to flexure of mastic or other sound dissipative adhesive materials, or interference or wave pattern interference due to mass location of the damping tape on the metal sheets or panels. It is possible, though by no means certain, that the sound damping tapes exert their sound damping effects by reason of collision or intermittent contact with the non-adhesive, particularly striated or creped, paper or the like with the vibrating portions of the metal sheets or panels, or through friction due to flexure of said non-adhesive conversion material portion of said tapes, or by reason of a resilient deformation of said conversion material. There are indications that the creped paper portion of the damping tapes slaps against or strikes the vibrating metal sheets or panels thereby bringing about a rapid decrease in the amplitude of vibration; and also that the creped paper or the like possesses a spring-like or springy action which allows the damping tape to vibrate out of phase with the metal sheet or panel, again thereby bringing about a rapid decrease in the amplitude of vibration of the metal sheet or panel. Most likely, the reasons for the unique functioning of the sound damping tapes of the present invention are due to a combination of two or more of the foregoing mechanisms.

What is claimed as new and desired to be protected by Letters Patent of the United States is:

1. A sound damping tape wound upon itself in roll form, said tape comprising a layer of a sound dissipative material of adhesive character to which is adhered a longitudinally extenning area of a creped non-adhesive conversion material of lesser width than the width of the surface of said sound dissipative material, said area of creped non-adhesive conversion material leaving spaced longitudinally extending surface areas of said sound dissipative material whereby pieces of said tape may be firmly adhered to a metal surface.

2. A sound damping tape wound upon itself in roll form comprising a flexible tape base in the form of metal foil laminated to paper, said metal foil carrying a release coating on essentially its entire outer exposed surface, a layer of a tacky adhesive mastic covering mainly the width of said tape base but leaving uncovered longitudinally extending edges on said tape base, said tacky adhesive mastic being provided with an overlying longitudinally extending area of non-adhesive conversion material, said conversion material overlying only a portion of the width of said tacky adhesive mastic, said conversion material leaving spaced longitudinally extending areas of said tacky adhesive mastic.

3. A sound damping tape wound upon itself in roll form, said tape comprising a metal foil tape base carrying a release coating on its exterior surface and carrying a layer of a tacky adhesive mastic covering mainly the entire width of its interior surface, said tacky adhesive mastic being provided with an overlying longitudinally extending area of non-adhesive striated material of lesser width than the width of the tacky adhesive mastic, said non-adhesive striated material area leaving spaced longitudinally extending areas of said tacky adhesive mastic.

4. A sound damping tape wound upon itself in roll form, said tape comprising a layer of a sound dissipative material to a surface of which is adhered a continuous, longitudinally extending area of a creped non-adhesive conversion material of lesser width than the width of said surface, said area of creped non-adhesive conversion material leaving substantially parallel longitudinally extending spaced surface areas of said sound dissipative material which lie in a plane above the plane of the lowest point in the creped non-adhesive conversion material, said spaced surface areas being adhesive-surfaced whereby pieces of said tape may be firmly adhered to a metal surface.

5. A sound damping tape wound upon itself in roll form, said tape having a width of about 1 to 2 inches and comprising an aluminum foil tape base carrying a release coating on its exterior surface and carrying a layer of a tacky adhesive mastic about ⅛ to ⅜ inch in thickness and covering mainly the entire width of its interior surface, said tacky adhesive mastic being provided with an overlying longitudinally extending area of non-adhesive creped parchment paper having from 15 to 65 crepe lines per lineal inch, said creped parchment paper being of lesser width than the width of the tacky adhesive mastic, said non-adhesive creped parchment paper area leaving spaced longitudinally extending areas of said tacky adhesive mastic.

6. A sound damping tape comprising a layer of a sound dissipative material to a surface of which is adhered a longitudinally extending area of creped non-adhesive conversion material of lesser width than the width of said surface of said sound dissipative material, said area of creped non-adhesive conversion material leaving spaced longitudinally extending areas of said sound dissipative material, said spaced areas being adhesive-surfaced whereby said tape may be firmly adhered to a metal surface.

7. A sound damping tape comprising a tape base to a surface of which is secured a longitudinally extending area of a heat resistant creped conversion material of lesser width than the width of the tape base, said sound damping tape being adapted to be attached to a vibratable metal surface subject to high temperatures with the creped conversion material being in contact with the said surface.

8. A sound damping tape comprising a tape base carrying a release coating on essentially its entire outer exposed surface, a layer of a sound dissipative material of adhesive character covering mainly the width of said tape base but leaving uncovered longitudinally extending edges on said tape base, said sound dissipative material being provided with an overlying longitudinally extending area of non-adhesive conversion material, said conversion material overlying only a portion of the width of said sound dissipative material, said conversion material leaving spaced longitudinally extending areas of said sound dissipative material.

9. A sound damping tape comprising a flexible tape base carrying a layer of a sound dissipative material covering mainly the entire width of its interior surface, said sound dissipative material having a tacky adhesive exposed surface overlying which are longitudinally extending areas of non-adhesive creped paper of lesser width than the width of said sound dissipative material, said creped paper areas being laterally spaced from each other to leave spaced longitudinally extending areas of said tacky adhesive.

10. A sound damping tape comprising a metal foil tape base carrying a layer of a tacky adhesive mastic covering mainly the entire width of its surface, said tacky adhesive mastic being provided with an overlying longitudinally extending area of non-adhesive striated material of lesser width than the width of the tacky adhesive mastic, said non-adhesive striated material area leaving spaced longitudinally extending areas of said tacky adhesive mastic.

11. A sound damping tape comprising an aluminum foil tape base carrying a layer of a tacky adhesive mastic covering mainly the entire width of its surface, said tacky adhesive mastic being provided with an overlying longitudinally extending area of non-adhesive creped parchment paper of lesser width than the width of the tacky adhesive mastic, said non-adhesive creped parchment paper area leaving spaced longitudinally extending areas of said tacky adhesive mastic.

12. A sound damping tape comprising a tape base in the form of a metal foil laminated to paper, said metal foil carrying a release coating on essentially its entire outer exposed surface, a layer of a tacky adhesive mastic about ⅛ to ⅜ inch in thickness covering mainly the width of said tape base, said tacky adhesive mastic being provided with an overlying longitudinally extending area of non-adhesive striated conversion material, said conversion material overlying only a portion of the width of said tacky adhesive mastic, said conversion material leaving spaced longitudinally extending areas of said tacky adhesive mastic.

13. A vibration damped construction comprising metal in sheet or panel form subject to vibration in use and carrying on only limited areas of its surface at least one tape, said tape comprising a layer of a sound dissipative material to a surface of which is adhered at least one area of non-adhesive conversion material of lesser width than the width of said surface of the sound dissipative material, said area or areas of non-adhesive conversion material being disposed longitudinally of the tape and leaving spaced longitudinally extending adhesive-surfaced areas of said sound dissipative material, said tape being adhered to the afore said limited areas of the surface of the metal in sheet or panel form through said spaced longitudinally extending adhesive-surfaced areas with said non-adhesive conversion material lying substantially flat against the surface of the metal sheet or panel.

14. A vibration damped construction comprising metal in sheet or panel form subject to vibration in use and carrying on only limited areas of its surface at least one tape, said tape comprising a flexible tape base in the form of metal foil laminated to paper, said metal foil carrying a release coating on essentially its entire outer exposed surface, a layer of a tacky adhesive mastic covering mainly the width of said tape base but leaving uncovered longitudinally extending edges on said tape base, said tacky adhesive mastic being provided with an overlying longitudinally extending area of non-adhesive conversion material, said conversion material overlying only a portion of the width of said tacky adhesive mastic, said conversion material leaving spaced longitudinally extending areas of said tacky adhesive mastic, said tape being adhered to the aforesaid limited areas of the surface of the metal in sheet or panel form through said spaced areas of adhesive with said non-adhesive conversion material lying substantially flat against the surface of the metal sheet or panel.

15. A vibration damped construction comprising metal in sheet or panel form subject to vibration in use and carrying on only limited areas of its surface at least one tape, said tape comprising a metal foil tape base carrying a layer of a tacky adhesive mastic covering mainly the entire width of its surface, said tacky adhesive mastic being provided with an overlying area of non-adhesive striated material of lesser width than the width of the tacky adhesive mastic, said non-adhesive striated material area extending longitudinally of the tape and leaving spaced longitudinally extending areas of said tacky adhesive mastic, said tape being adhered to the aforesaid limited areas of the surface of the metal in sheet or panel form through said spaced longitudinally extending areas of tacky adhesive mastic with said non-adhesive striated material area lying substantially flat against the surface of the metal sheet or panel.

16. A vibration damped construction comprising metal in sheet or panel form subject to vibration in use and carrying on only limited areas of its surface at least one tape, said tape having a width of about 1 to 2 inches and comprising an aluminum foil tape base carrying a layer of a tacky adhesive mastic about ⅛ to ⅜ inch in thickness and covering mainly the entire width of its surface, said tacky adhesive mastic being provided with an overlying area of non-adhesive creped parchment paper having from 16 to 65 crepe lines per lineal inch, said creped parchment paper being of lesser width than the width of the tacky adhesive mastic, said non-adhesive creped parchment paper areas extending longitudinally of the tape and leaving spaced longitudinally extending areas of said tacky adhesive mastic, said tape being adhered to the aforesaid limited areas of the surface of the metal in sheet or panel form through said spaced longitudinally extending areas of tacky adhesive with said non-adhesive creped parchment paper area lying substantially flat against the surface of the metal sheet or panel.

References Cited by the Examiner
UNITED STATES PATENTS

| | | | |
|---|---|---|---|
| 1,823,278 | 9/31 | Martin | 161—406 X |
| 2,395,668 | 2/46 | Kellgren et al. | 161 |
| 2,819,032 | 1/58 | Detrie et al. | 161—145 X |

LEO SMILOW, *Primary Examiner.*

MORRIS SUSSMAN, EARL M. BERGERT,
*Examiners.*